US011816977B1

(12) United States Patent
Lin

(10) Patent No.: US 11,816,977 B1
(45) Date of Patent: Nov. 14, 2023

(54) SOMATOSENSORY GENERATION SYSTEM FEATURING THERMAL EFFECTS

(71) Applicant: Feng-Chou Lin, New Taipei (TW)

(72) Inventor: Feng-Chou Lin, New Taipei (TW)

( * ) Notice: Subject to any disclaimer, the term of this patent is extended or adjusted under 35 U.S.C. 154(b) by 0 days.

(21) Appl. No.: 17/903,944

(22) Filed: Sep. 6, 2022

(51) Int. Cl.
| | |
|---|---|
| H04B 3/36 | (2006.01) |
| G08B 6/00 | (2006.01) |
| G06F 3/01 | (2006.01) |
| A63F 13/28 | (2014.01) |
| G06F 8/30 | (2018.01) |

(52) U.S. Cl.
CPC ............... *G08B 6/00* (2013.01); *A63F 13/28* (2014.09); *G06F 3/011* (2013.01); *G06F 3/016* (2013.01); *A63F 2300/302* (2013.01); *G06F 8/30* (2013.01)

(58) Field of Classification Search
CPC ...... G08B 6/00; A63F 13/28; A63F 2300/302; G06F 3/011; G06F 3/016; G06F 8/30
See application file for complete search history.

(56) References Cited

U.S. PATENT DOCUMENTS

| | | | |
|---|---|---|---|
| 2017/0177085 A1* | 6/2017 | Sun | G06F 3/012 |
| 2022/0189262 A1* | 6/2022 | Hockman | G08B 6/00 |
| 2022/0413614 A1* | 12/2022 | Gilg | G06F 40/221 |
| 2023/0135906 A1* | 5/2023 | Mani | H04N 21/44008 |
| | | | 345/156 |

\* cited by examiner

*Primary Examiner* — Toan N Pham
(74) *Attorney, Agent, or Firm* — Chun-Ming Shih; HDLS IPR SERVICES

(57) ABSTRACT

A somatosensory generation system featuring with thermal effects, includes a somatosensory effect controller used to access and process audio signals or control signals of actions or events of games, movies, AR/VR or application software from media players, game consoles, personal computers, AR/VR devices, and transmit them to at least a somatosensory effect conversion device and a plurality of somatosensory transducers are staggered distribution on the carrier to react the simulated waveform and heating information in corresponding to the portions of torso and limbs of the human body. This somatosensory generation system enhances immersive presence of entertainment dramatically and make users like to enter live action scenes through both haptic feedback and thermal effect applied on user's body.

8 Claims, 7 Drawing Sheets

SOMATOSENSORY GENERATION SYSTEM FEATURING THERMAL EFFECTS

BACKGROUND OF THE INVENTION

Field of the Invention

The present invention relates to the technical field of somatosensory feedback, especially a somatosensory generation system featuring thermal effects.

The Prior Arts

With the advancement and development of science and technology, the somatosensory feedback technology of human-computer interaction can increase the interactive effect based on the feeling of film and vision, and is effectively combined and applied to 4D haptic feedback movies and games. Somatosensory, also known as bodily sensation, is a general sensory term for touch, pressure, temperature, pain and proprioceptive sensations. For example, in the early IMAX 4D movies, a huge screen was used with specially designed 4D seats, which vibrated, tilted, and shook, in line with the development of the movie's plot, allowing people to integrate into the movie characters during the viewing process, creating a special feeling of immersion, realism, and thrill.

In recent years, game consoles, AR/VR and computer 3D image processing technology have made tremendous progress. In order to allow players to have more realistic sensory stimulation, in the game control interface, such as a mouse, a joystick, a steering wheel, etc., The item of haptic feedback has been added, so that the game can simultaneously generate relative vibrations for actions or events and transmit them to the player's wrist, enhancing sensory stimulation to improve the fidelity of game operation simulation.

Most of the current somatosensory feedback devices use an eccentric motor with a single frequency motion of left and right vibration to achieve somatosensory vibration. It is used in conjunction with the relevant scenes of movies or games. Instructions convey the drive motor vibration to enhance the realistic effect of actions or events. but its structural design can only generate vibration through the left and right swing of the eccentric motor and cannot achieve the effect of replicating the real body sensation. At the same time, the temperature sensation of the object and the touch effect cannot be achieved, so that the scene content cannot be effectively simulated and truly reflected on the player.

Additionally, most of the somatosensory vibrators on the current somatosensory feedback devices are limited to only a few, if not single. To illustrate, most of the somatosensory vibrators in circulation today can only generate vibration on the part of the body. Fewer effect locations can achieve a limited sense of realism, and the vibration effect provided is limited to a single frequency swing, The vibration intensity is designed to only provide the most basic adjustment settings for certain actions or events.

When applying, each somatosensory feedback device must be set independently due to lack of compatibility. It cannot cooperate with the somatosensory feedback device of other body parts for collaborative feeling or with the development and application of the plot content. In case of being hit by a bullet through the chest and the back, the sensory time, the strength of force, the magnitude, the sequence, and the path changes for the reaction locations of various body parts etc., must align perfectly. It requires a robust real-life personal application. It is not always feasible to provide this in large-scale combat games. The simulated bomb blasting power spreads in all directions, and the immersive experience with different amplitudes and different feelings in the presence of multiple people results in technical problems of insufficient authenticity and effectiveness of somatosensory simulation.

SUMMARY OF THE INVENTION

In view of this, the primary purpose of the present invention is to provide a somatosensory generation system featuring thermal effects. The best implementation of this system is mainly installed on a chair, seatings, or wearable objects, including but not limited to, vests, Body SUIT, etc. The system mainly comprises: a somatosensory effect controller and at least one somatosensory effect conversion device; wherein The somatosensory effect controller provides packaged software through API or SDK (Software Development Kit) interface in that allows movie, AR/VR, or application software developers to edit their audio effects, and the audio or command data generated by the respecific signal of actions or events corresponding audio effects that is input to the somatosensory effect controller, and transmitted to the somatosensory effect conversion device in wired or wireless mode.

The somatosensory effect conversion device has a DSP (digital signal processor) that is built in, the DSP (digital signal processor) is responsible for decoding the command data signal and converting the command data signal into the corresponding somatosensory waveform, amplitude, position, temperature, and driving the somatosensory effect device through the somatosensory effect conversion device.

The somatosensory conversion device is provided with a plurality of somatosensory transducers vibrated to correspond to the portions that are close to the torso and limbs of the human body. Each somatosensory transducer is composed of a lower shell, a built-in T-shaped iron, and an upper cover, wherein an inner side of the upper cover is protruded with a cylinder which is winded by a coil to be sleeved into a groove of the built-in T-shaped iron. This is done so that the somatosensory transducer can receive the exclusive signal of actions or events to generate corresponding vibrating amplitudes, while at the same time, the upper cover is provided with a heating device to generate corresponding instantaneous heating with the exclusive signal of actions or events.

Preferably, the somatosensory effect controller additionally comprise of a piece of body suit, a seat, or a combination of the seat and the body suit.

In a preferred implementation, wherein the somatosensory effect conversion device can be driven by either direct audio mode or command data mode. It is not limited in practice therein.

Thereby, when the somatosensory effect controller is connected to the audio or control signals of the game, the movie, AR/VR, or any application software, the somatosensory effect controller can create an output of the exclusive signal of corresponding actions or events to drive the somatosensory conversion device.

Through a plurality of vibrated somatosensory transducers, the somatosensory transducer is used to receive the exclusive signal of actions or events to generate the corresponding specific vibrating waveform and amplitude; In addition to this, a heated coil is installed on the somatosensory transducer to generate corresponding instantaneous heating for actions or events, so that the audio effects that can truly replicate the content of the scene and the actions of the characters and produce immersive somatosensory feedback in real-time, such as: touching, fighting, shooting, blasting, etc. Different corresponding vibration or thermal effects are generated in the parts close to the human torso and limbs. The conduction expansion highlights the distribution of reaction locations, waveform patterns, strength, duration, the diffusion manner, and the diffusion range, etc., which greatly improves the fidelity of the real live effect of the game, movies or application software, and effectively enhances the immersive presence of the user experience.

EMBODIMENT

Figure 1:
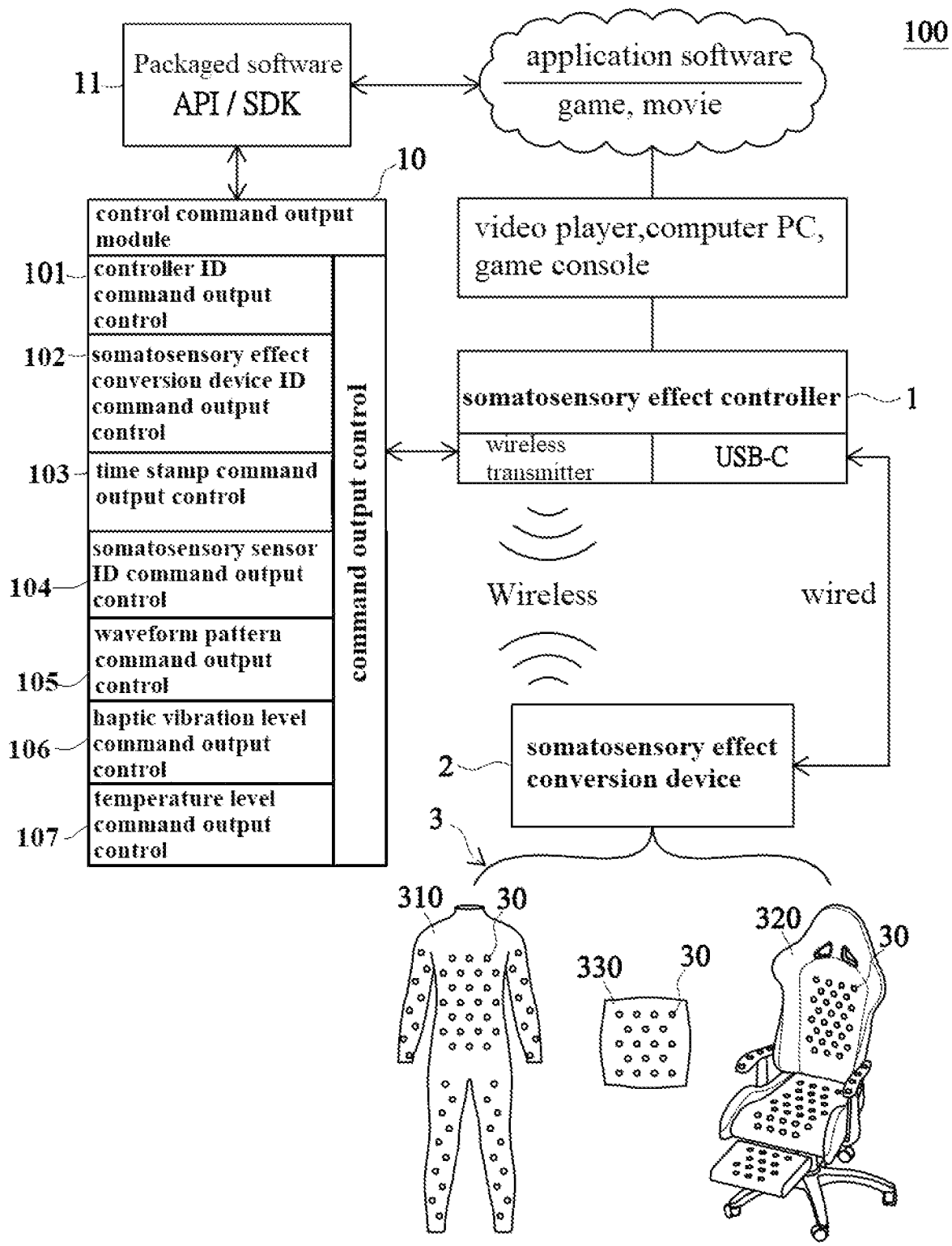
FIG. 1 is a configuration diagram of the system of the present invention.
Figure 2:
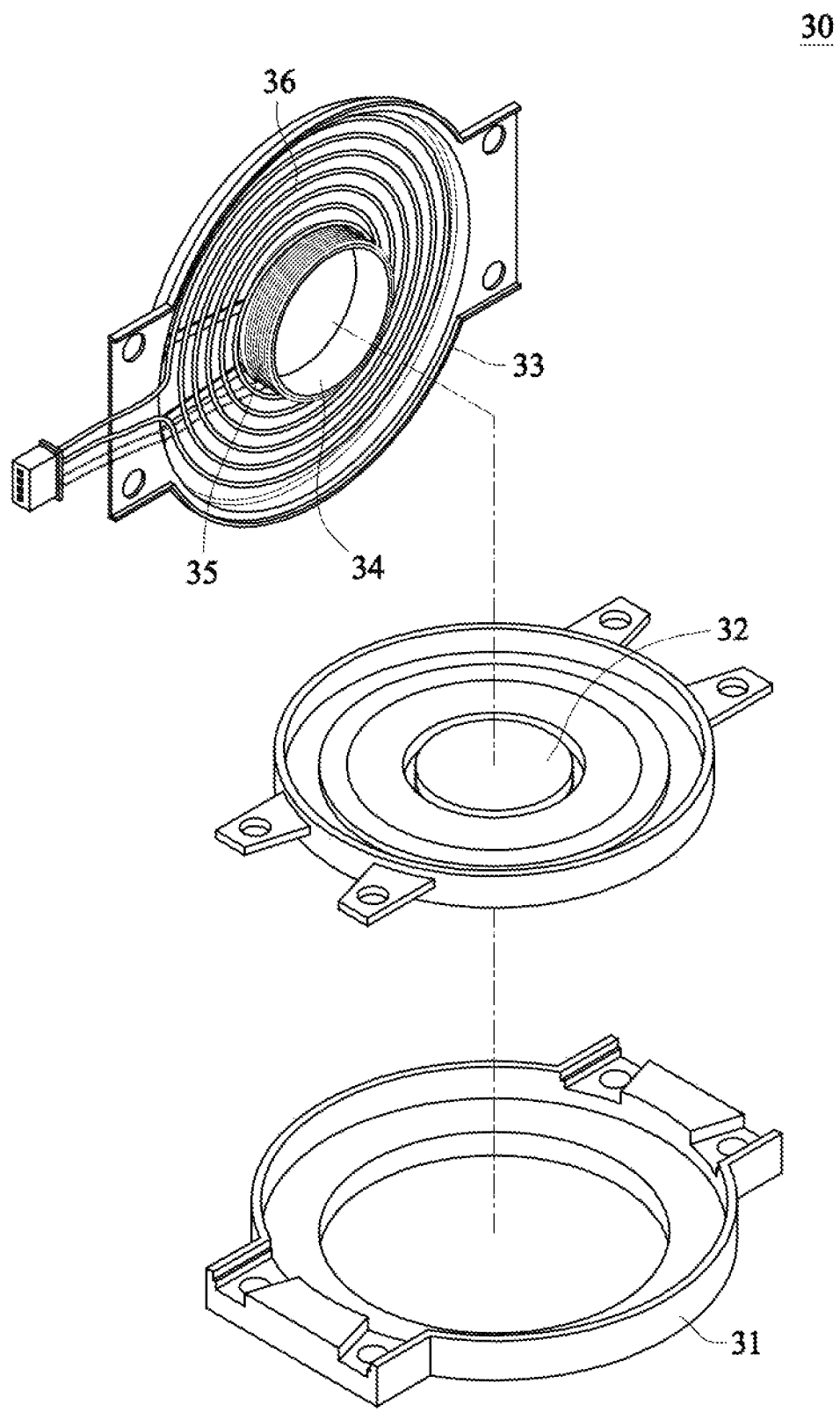
FIG. 2 is an exploded perspective view of the somatosensory transducer of the present invention.
Figure 3:
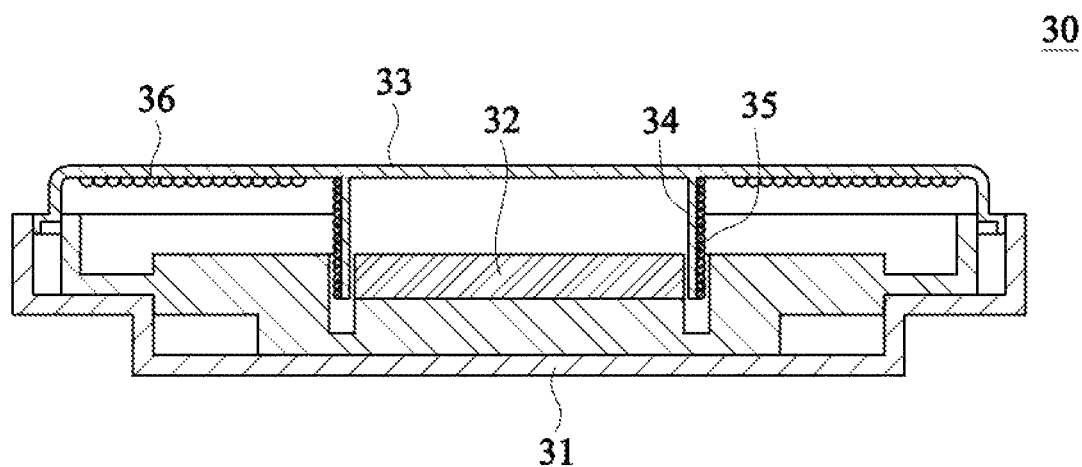
FIG. 3 is a cross-sectional view of the combination of the somatosensory transducer of the present invention.

In order to facilitate the understanding of the content of the present invention and the effect that can be achieved, specific embodiments are listed herewith in conjunction with the drawings, and the detailed description is as follows: Please refer to FIG. 1 to FIG. 4. The a somatosensory generation system featuring thermal effects 100 mainly comprises: a somatosensory effect controller 1, a somatosensory effect conversion device 2, and at least one somatosensory effect device 3; wherein The somatosensory effect controller 1 provides package software 11 through API or SDK (Software Development Kit) interface, allowing game, movie, AR/VR, or application software developers to edit their audio effects to generate corresponding audio or command data signal. While audio or command data generated by playback of video games or movie on a media player or a game console or Personal Computer or a AR/VR device, it will be sent to somatosensory effect conversion device 2 by wired port for example USB Type C but not limited or wireless.

The somatosensory effect conversion device 2 is built-in a DSP (digital signal processor) 25, the DSP (digital signal processor) is responsible for decoding the command data signal and converting the command data signal into the corresponding somatosensory waveform, amplitude, position, temperature, and driving the somatosensory effect device 3 through the somatosensory effect conversion device 2;

The somatosensory effect device 3 is provided with a plurality of somatosensory transducers 30 which vibrates to correspond to the portions that are close to the torso and limbs of the human body, each somatosensory transducer 30 is composed of a lower shell 31, a built-in T-shaped iron 32, and an upper cover 33, wherein an inner side of the upper cover 33 is protruded with a cylinder 34 which is winded by a coil 35 to be sleeved into a groove of the built-in T-shaped iron 32, so that the somatosensory transducer 30 can receive the exclusive signal of actions or events to generate corresponding waveforms and vibrating amplitudes, at the same time, the upper cover 33 is provided with a heating device 36 to generate corresponding instantaneous heating with the exclusive signal of actions or events.

Preferably, the heating device 36 is composed of a heating wire, or a graphene electric heating sheet, but the reality is not limited to the foregoing.

Figure 5:
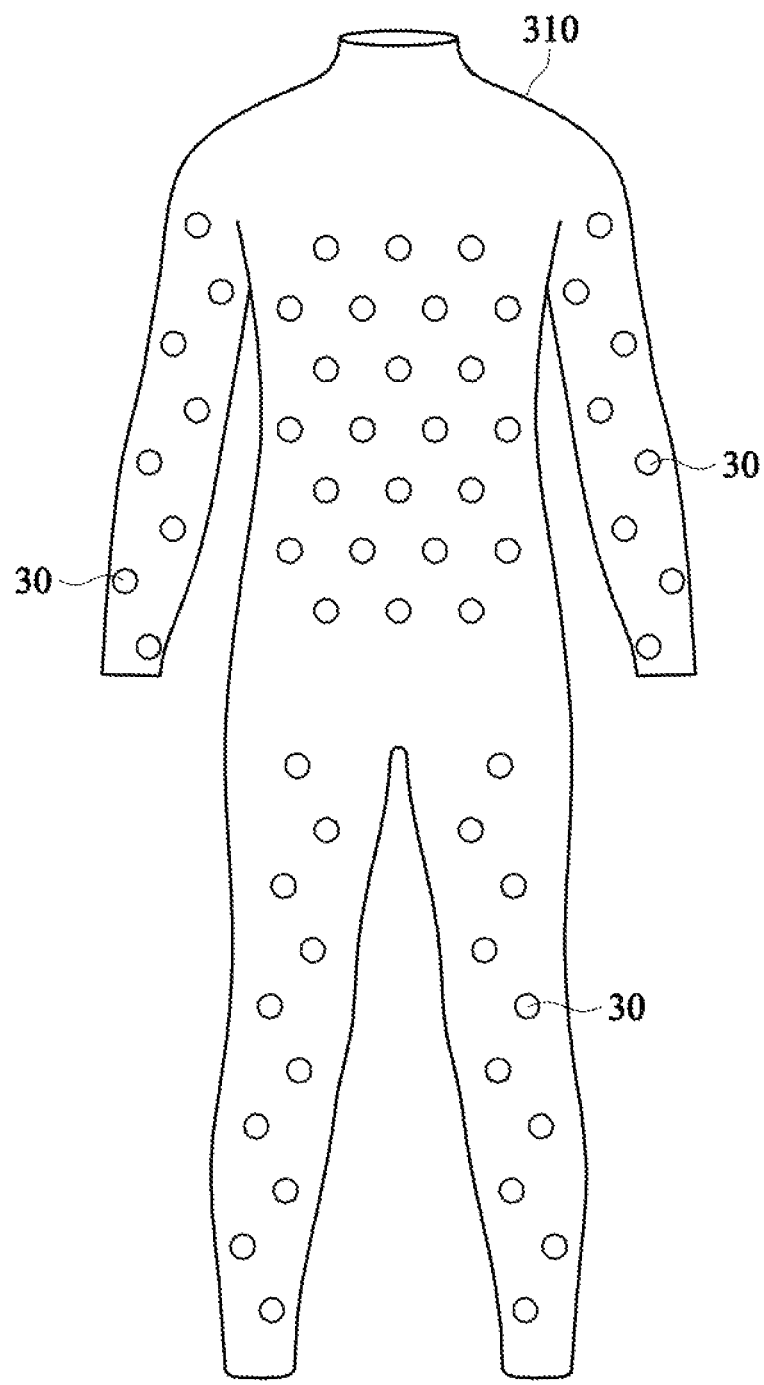
FIG. 5 is a schematic diagram of the body suit of the somatosensory effect device of the present invention.
Figure 6:
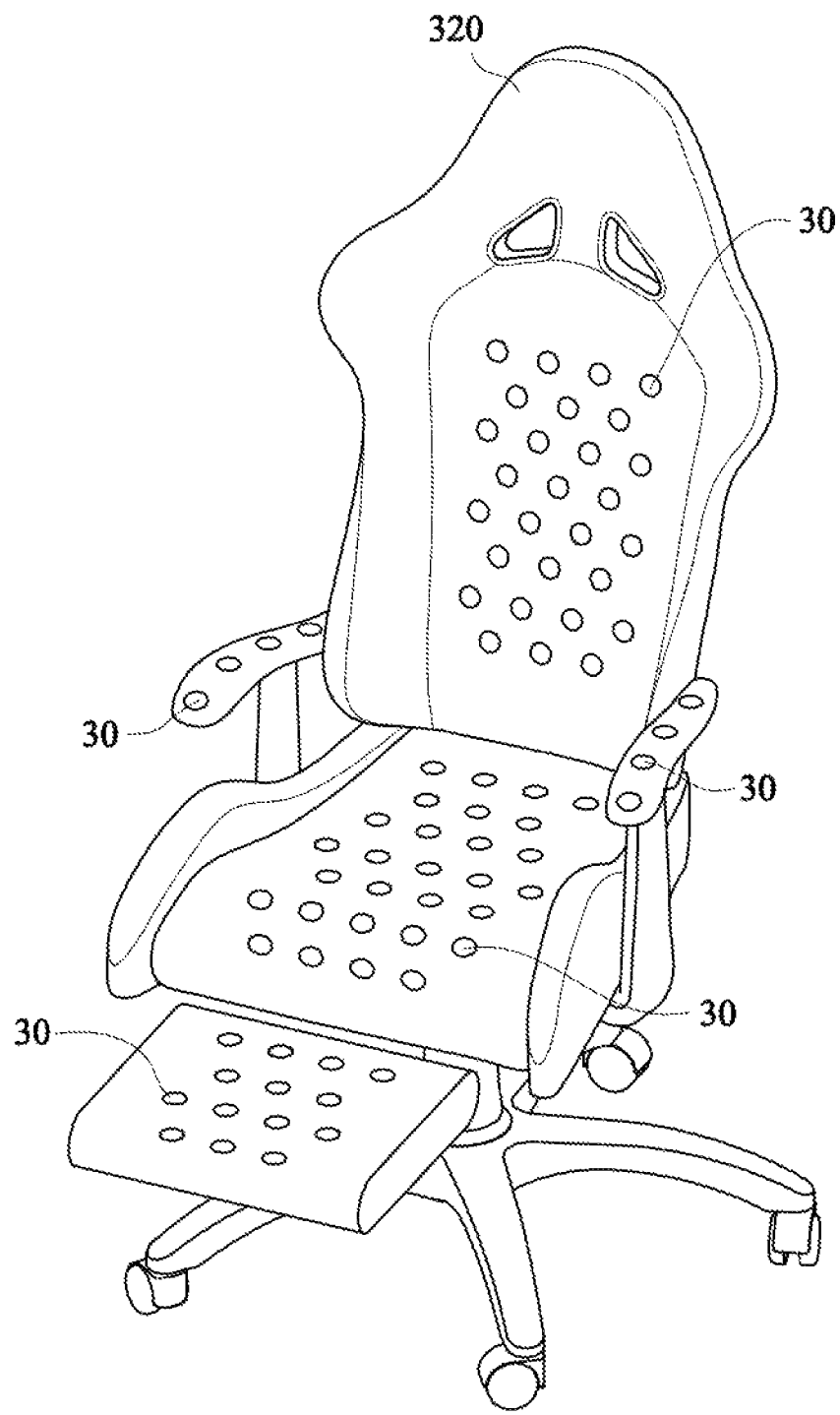
FIG. 6 is a schematic diagram of the seat of the somatosensory effect device of the present invention.
Figure 7:
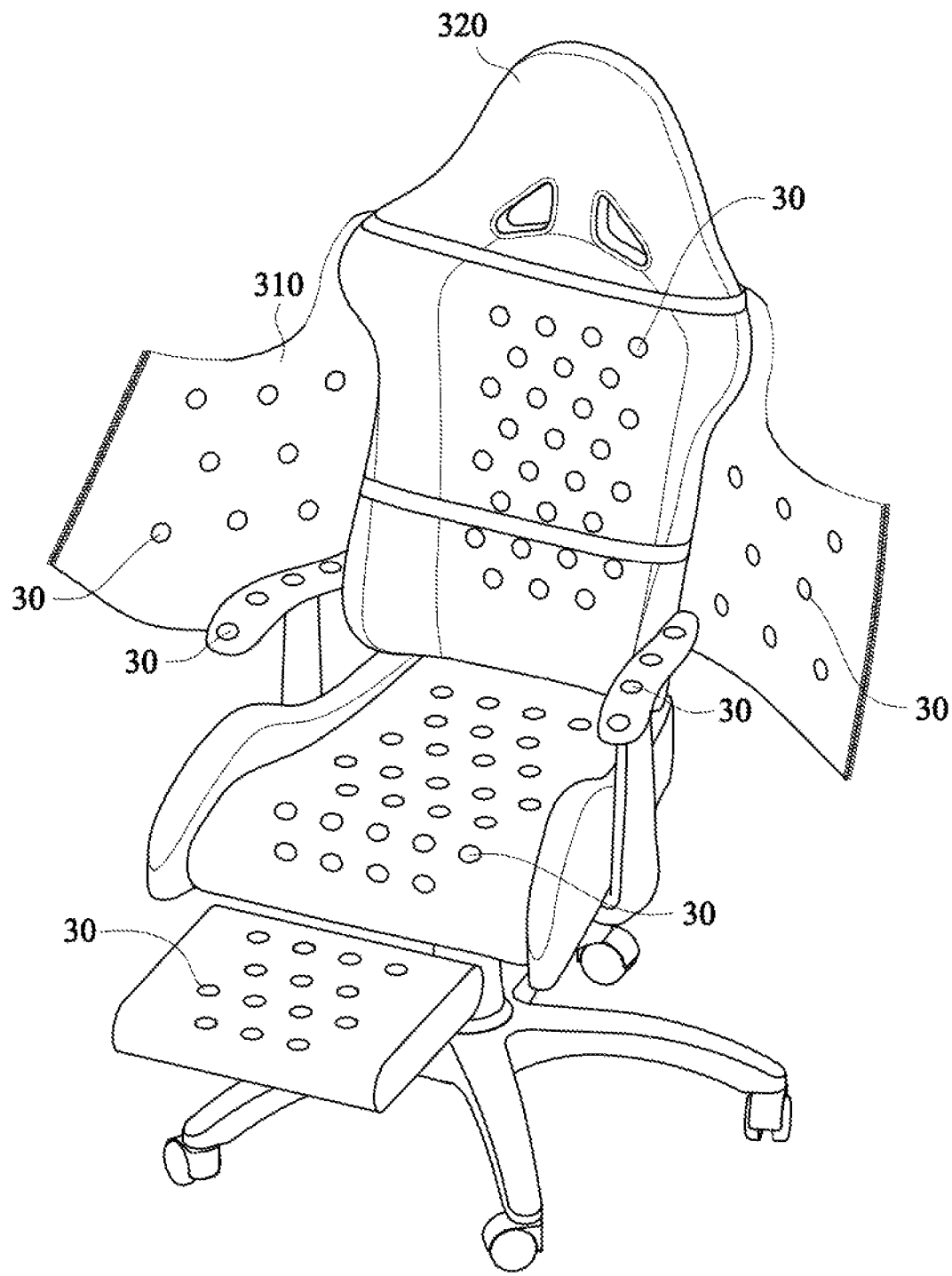
FIG. 7 is a schematic diagram of the combination of the seat and the clothes of the somatosensory effect device of the present invention.

Preferably, as shown in FIG. 5 to FIG. 7, the somatosensory effect device 3 is further composed of body suit 310, a seat 320, or a combination of the body suit 310 and the seat 320, but in reality, it is not limited to foregoing.

In a preferred implementation, as shown in FIG. 1, the somatosensory effect device 3 is further attached with a cushion 330, which is also provided with a plurality of somatosensory transducers 30 distributed in a staggered manner, so that the user can place the transducers 30 on the seat, or on the sofa to give back somatosensory feedback.

Figure 4:
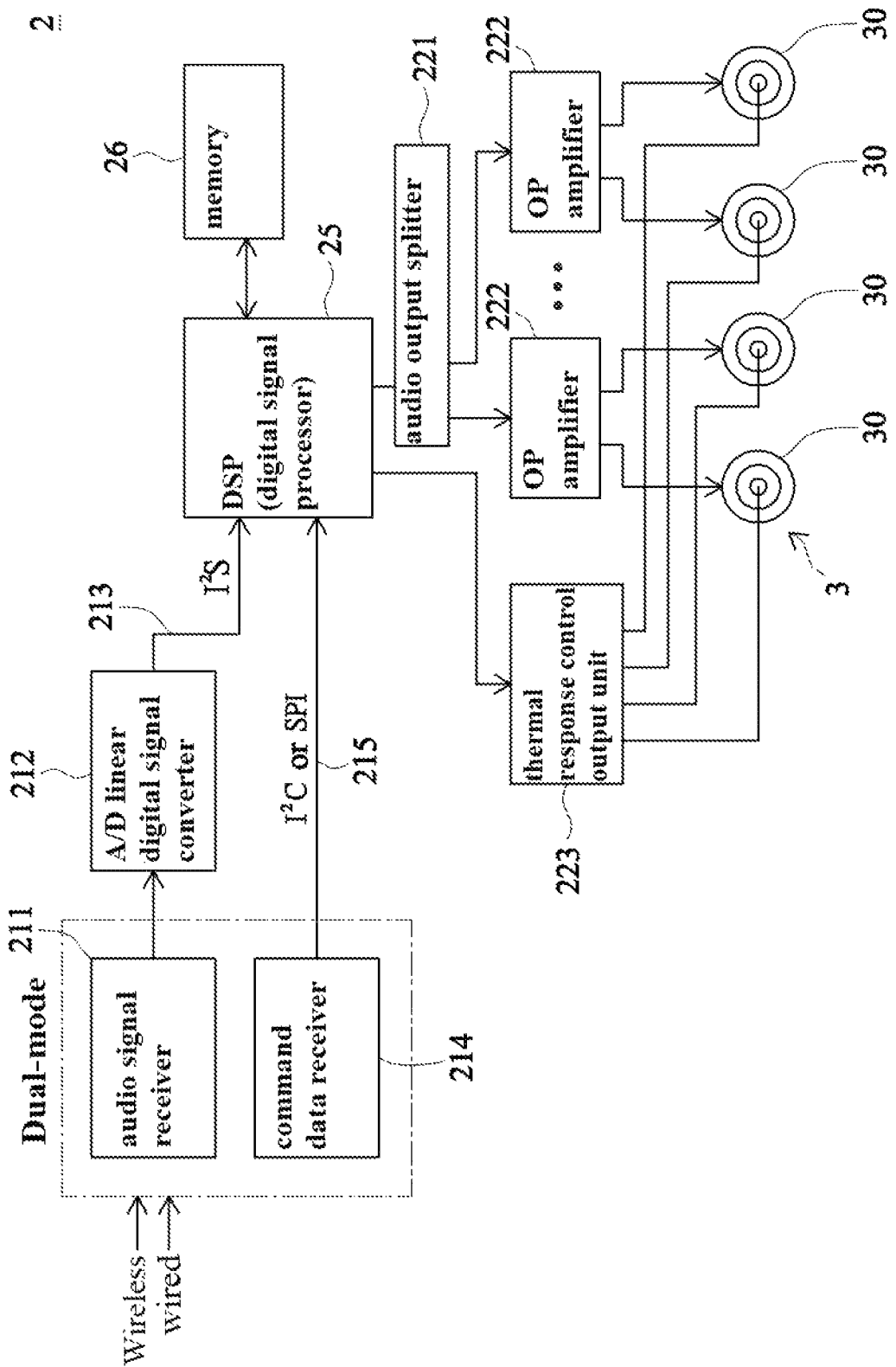
FIG. 4 is a block diagram of the system of the present invention.

Preferably, as shown in FIG. 1 and FIG. 4, wherein the somatosensory effect conversion device 2 further has a DSP (digital signal processor) 25 to connect with a memory 26, and the memory 26 is internally stored with a plurality of exclusive signals of actions or events, that comprises of, versatile sound effects on WAV, MP3, or MID format and will output different waveforms of actions or events, the length for each of the exclusive signals of actions or events is between 50 ms and 2000 ms, but not be limited, corresponding to a somatosensory feedback for different actions or events.

In a preferred implementation, the present invention is designed to provide the somatosensory effect controller 1 with a package software 11, which can provide tabular menu check settings for each action or event, so that the plurality of somatosensory sensors 30 will drive simultaneously but parameters of each distribution of reaction locations, waveform pattern, force intensity, duration, diffusion pattern, and diffusion range etc., are controlled independently, that make the user can realize the reproduction or simulation of human body dynamics according to the content of actions or events. Basically, comprises of temperature information and its code of the object moving on the human skin, the position change of the human body and the force relationship motion information and its codes, as well as the vibration information and codes of the sensations that objects emit vibrations and act on the human body, such as the vibration sensation of touching, fighting, Gunshots, the voice vibration of loud explosions, etc., but in reality it is not limited to foregoing.

Preferably, wherein the somatosensory effect conversion device 2 can be input by wired or wireless dual-mode manner, wherein the somatosensory effect conversion device 2 is a wired or wireless dual-mode driver, and an input end of the somatosensory effect conversion device 2 has at least an audio signal receiver 211 to connect an A/D linear digital signal converter 212 to convert an analog signal into a first signal source that is fed by way of an I$^2$S integrated circuit built-in audio bus 213, so that the received audio can generate relative somatosensory feedback effects of actions or events according to the development of the plot, such as sparring, slapping, being shot, blasting, etc. It is not limited to the foregoing. And a second signal source of a command data receiver is fed by way of an I$^2$C or SPI serial bus 215, so that it can receive operational command data from video players, computer PCs, game consoles, AR/VR devices etc. to generate the corresponding somatosensory feedback of actions or events, such as touching, punching, shooting reaction force, etc., but not limited to this.

Preferably, the output of the somatosensory effect conversion device 2 at least has an audio output splitter 221 to linear connect to a DSP (digital signal processor) 25, through a plurality of OP operational amplifiers 222 with corresponding to drive the plurality of somatosensory transducers 30, and a thermal response control output unit 223 drives each of the heating device 36 on the plurality of somatosensory transducer 30 with a corresponding output to generate corresponding instantaneous heating.

Preferably, the somatosensory effect controller 1 further internally built-in a control command output module 10 which receives and transmits the content of the command data packet, comprises of: a controller ID command output control 101, a somatosensory effect conversion device ID command output control 102, a time stamp command output control 103, a somatosensory transducer ID command output control 104, a waveform pattern command output control 105, a haptic vibration level command output control 106, and a temperature level command output control 107.

Preferably, when the present invention is applied, the somatosensory effect controller 1 and the somatosensory response device 2 can be connected in one-to-one or one-to-many configurations. It is particularly worth mentioning that The somatosensory effect conversion device 2 of the present invention is a dual-mode design, which can be driven in either of general standard audio mode or command data mode respectively, and can provide check settings for each action or event in a tabular menu. The plurality of somatosensory transducers 30 are driven simultaneously but each of the somatosensory transducers 30 works independently on its own response location distribution, waveform pattern, force intensity, duration, diffusion mode, and diffusion range, etc. In the application, this somatosensory generation system will simulate and reproduce the action or event according to the content of the plot, and the space distance, and though reflect the motion simulation on human feedback.

Thereby, as shown in FIG. 1 to FIG. 7, when the somatosensory effect controller 1 is connected to the audio signal or control signals of the game, movie, AR/VR, or application software, signals can be output to the somatosensory effect conversion device 2 in a wired or wireless manner to drive the exclusive signal of actions or events corresponding to be provided. Through a plurality of staggered somatosensory transducers 30, the somatosensory transducer 30 is used to receive the exclusive signal of actions or events to generate the corresponding specific waveform and amplitude; and used to a heating device 36 that is installed on the somatosensory transducer 30 to generate corresponding instantaneous heating for actions or events, so that the audio effects can truly reflect the content of the scene and the actions of the characters, which can produce immersive somatosensory feedback in real-time, such as: touching, fighting, shooting, blasting, etc. Different corresponding vibration or heating effects are generated in the parts close to the human torso and limbs. The conduction expansion highlights the distribution of reaction locations, strength, duration, diffusion mode, and diffusion range, etc. And greatly improve the fidelity of the real live effects of games, movies, or application software, such as the magnitude of the force, sequence, and path changes of the reaction locations of various parts of the body when a bullet hits through the chest and back, or simulates the blasting power of bombs in large-scale battle field games. The radiating diffusion allows multiple people to experience different amplitudes at different locations, which effectively enhances the immersive presence of the user experience.

To sum up, the novelty and practicality of the present invention fully complies with the requirements of a patent, and an application for a patent for invention is filed. However, the above are only preferred embodiments of the present invention, and should not limit the scope of implementation of the present invention; therefore, any equivalent changes and modifications made according to the scope of the patent application of the present invention and the contents of the creation specification that should belong to the scope covered by the patent of the present invention.

What is claimed is:

1. A somatosensory generation system featuring thermal effects, comprising:
   a somatosensory effect controller, a somatosensory effect conversion device, and at least one somatosensory effect device; wherein
   the somatosensory effect controller provides packaged software through an API or SDK (Software Development Kit) interface in that allows video game, movie, AR/VR game, or application software developers to edit the effects of actions or events to generate a exclusive audio or command data signal correspondingly and then input to the somatosensory effect controller, and transmit to the somatosensory effect conversion device in wired or wireless mode;
   the somatosensory effect conversion device has a built-in DSP (digital signal processor), the DSP (digital signal processor) decodes the command data signal and converts the command data signal into the corresponding somatosensory waveform, amplitude, position, temperature, and driving these somatosensory effects through the somatosensory effect device;
   the somatosensory effect device is provided with a plurality of somatosensory transducers staggered to correspond to portions that are close to a torso and limbs of the human body, each somatosensory transducer is composed of a lower shell, a built-in T-shape iron, and an upper cover, wherein an inner side of the upper cover is protruded with a cylinder which is winded by a coil to be sleeved into a groove of the built-in T-shape iron, so that the somatosensory transducer can receive the exclusive signal of actions or events to generate corresponding waveforms and amplitudes, at the same time, the upper cover is provided with a heating device to generate corresponding instantaneous heating with the exclusive signal of actions or events.

2. The somatosensory generation system featuring thermal effects as claimed in claim 1, wherein the somatosensory effect device further comprises of a piece of body suit, a seat, or a combination of the seat and the body suit.

3. The somatosensory generation system featuring thermal effects as claimed in claim 2, wherein the somatosensory effect device further comprises of a cushion on which the plurality of somatosensory transducers are arranged in a staggered manner.

4. The somatosensory generation system featuring thermal effects as claimed in claim 1, wherein the heating device is composed of a heating wire, or a graphene electric heating sheet.

5. The somatosensory generation system featuring thermal effects as claimed in claim 1, wherein the somatosensory effect conversion device is driven by either of audio or command data on a dual-mode manner.

6. The somatosensory generation system featuring thermal effects as claimed in claim 1, wherein, the somatosensory effect controller with internally built-in a control command output module which receives and transmits the content of the command data packet, comprises of: a controller ID command output control, a somatosensory effect conversion device ID command output control, a time stamp command output control, a somatosensory transducer ID command output control, a waveform pattern command output control, a haptic vibration level command output control, and a temperature level command output control.

7. The somatosensory generation system featuring thermal effects as claimed in claim 1, wherein the somatosensory effect conversion device further has the DSP (digital signal processor) to connect with a memory, and the memory is internally stored with a plurality of the exclusive signal effect files of actions or events, that comprises of, versatile sound effects on WAV, MP3, or MID format and will output different waveforms of actions or events, corresponding to a somatosensory feedback for different audio of actions or events, wherein the somatosensory effect conversion device is connected in a wired or wireless manner, and an input end of the somatosensory effect conversion device has at least an audio signal receiver as a first signal source which connects with an A/D linear digital signal converter to convert an analog signal into an $I^2S$ integrated circuit built-in audio bus, and a second signal source of a command data receiver which feeds command data into the DSP (digital signal processor) by way of an $I^2C$ or SPI serial bus; an output end of the somatosensory effect conversion device at least has an audio output splitter drives the plurality of somatosensory transducers with corresponding outputs through a plurality of OP operational amplifiers, and a thermal response temperature control output unit drives each of the heating device of the plurality of somatosensory transducers with corresponding outputs to generate corresponding instantaneous heating.

8. The somatosensory generation system featuring thermal effects as claimed in claim 1, wherein the somatosensory effect controller and the somatosensory effect conversion device are connected to share the information and provide check settings in a tabular menu for each action or event, so that the plurality of somatosensory transducers are actuated simultaneously, and each of the somatosensory transducers work independently on its own parameters of command data, comprising: a distribution of reaction locations, a waveform pattern, a strength intensity, a time length, a reaction diffusion pattern, and a diffusion range, so that actions or events are truly reproduced according to a content of a plot, and spatial and temporal distances are reflected in motion simulation on feedback of the human body.

\* \* \* \* \*